(12) United States Patent
Lim et al.

(10) Patent No.: US 10,334,214 B2
(45) Date of Patent: Jun. 25, 2019

(54) METHOD AND APPARATUS CONFIGURED FOR COMBINED VIBRATORY AND PROJECTION FUNCTIONS

(71) Applicant: MOTOROLA MOBILITY LLC, Chicago, IL (US)

(72) Inventors: David K. Lim, Glenview, IL (US); William R. Groves, Naperville, IL (US); Jiri Slaby, Buffalo Grove, IL (US); Jason P. Wojack, Libertyville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 309 days.

(21) Appl. No.: 14/932,305

(22) Filed: Nov. 4, 2015

(65) Prior Publication Data

US 2017/0006267 A1   Jan. 5, 2017

Related U.S. Application Data

(60) Provisional application No. 62/186,401, filed on Jun. 30, 2015.

(51) Int. Cl.
*H04N 9/31* (2006.01)
*H04N 9/12* (2006.01)
*G03B 21/28* (2006.01)
*G06F 3/01* (2006.01)
*H04M 19/04* (2006.01)

(52) U.S. Cl.
CPC ........... *H04N 9/3173* (2013.01); *G03B 21/28* (2013.01); *G06F 3/016* (2013.01); *H04M 19/04* (2013.01); *H04M 19/047* (2013.01); *H04N 9/3185* (2013.01); *H04N 9/3188* (2013.01); *H04N 9/3194* (2013.01)

(58) Field of Classification Search
CPC .................................................... H04N 9/3173
USPC ......................................................... 348/441
See application file for complete search history.

(56) References Cited

U.S. PATENT DOCUMENTS

| 6,107,770 A * | 8/2000 | Jackson | B64G 1/28 244/165 |
| 9,360,680 B1* | 6/2016 | Syrgabaev | G02B 27/648 |
| 2010/0022274 A1* | 1/2010 | Roberts | H04M 1/0272 455/566 |
| 2012/0214546 A1* | 8/2012 | Osaka | H04M 1/0272 455/556.1 |

(Continued)

OTHER PUBLICATIONS

Orientalmotor, Linear & Rotary Actuators, 2014, http://www.orientalmotor.com/, Oriental Motor U.S.A. Corp., all pages.

(Continued)

*Primary Examiner* — Jefferey F Harold
*Assistant Examiner* — Justin B Sanders

(57) ABSTRACT

Apparatus, such as can be included in an electronic device, performs a method for operating apparatus configured for combined vibratory and projection functions. The apparatus includes a mirror configured to reflect a projected image and a motor. The mirror is coupled as a counterweight to the motor to configure the apparatus for a vibratory function. The motor is further configured to translate and rotate the mirror about a first axis to align the mirror with a projector to reflect the projected image during a projection function.

20 Claims, 11 Drawing Sheets

(56) References Cited

U.S. PATENT DOCUMENTS

| | | | |
|---|---|---|---|
| 2013/0063706 A1* | 3/2013 | Kilcher | G02B 26/0833 |
| | | | 353/99 |
| 2013/0250388 A1* | 9/2013 | Nozaki | G02B 26/101 |
| | | | 359/214.1 |
| 2016/0037144 A1* | 2/2016 | Schultz | G03B 21/28 |
| | | | 348/745 |
| 2016/0202472 A1* | 7/2016 | Sasaki | B60K 35/00 |
| | | | 353/98 |

OTHER PUBLICATIONS

Guangzhou SeeShow Stage Equipment Co., Limited, 2007-2014, Products > Moving head, all pages.

\* cited by examiner

METHOD AND APPARATUS CONFIGURED FOR COMBINED VIBRATORY AND PROJECTION FUNCTIONS

RELATED APPLICATIONS

The present application is related to and claims benefit under 35 U.S.C. § 119(e) from U.S. Provisional Patent Application Ser. No. 62/186,401, filed Jun. 30, 2015, titled "Method and Apparatus Configured for Combined Vibratory and Projection Functions", which is commonly owned with this application by Motorola Mobility LLC, the entire contents of which are incorporated herein by reference.

FIELD OF THE DISCLOSURE

The present disclosure relates generally to electronic devices and more specifically to electronic devices having apparatus configured for combined vibratory and projection functions.

BACKGROUND

Users of electronic devices often want to share images and information on their display screens and stored in their electronic devices to multiple people at once. In this regard, they are relying on their electronic device to have presentation or projection functionality that enables a room full of people to see their images, spreadsheets, or presentations, for example. As such, the electronic devices often include projection apparatus and optical hardware within increasingly confined spaces in order to project images from the electronic devices.

Due to the increasing space limitations, hardware designers look for ways to efficiently use internal space. One option is to reduce the size of internal components within the electronic device. Another option is to reduce the number of the internal components within the electronic device. However, some internal components remain due to their contribution to the electronic device's basic operation and other internal components remain due to users' current tastes and request for their electronic devices to have multiple functions and purposes.

BRIEF DESCRIPTION OF THE FIGURES

The accompanying figures, where like reference numerals refer to identical or functionally similar elements throughout the separate views, form part of the specification and illustrate embodiments in accordance with the included claims.

Figure 1:
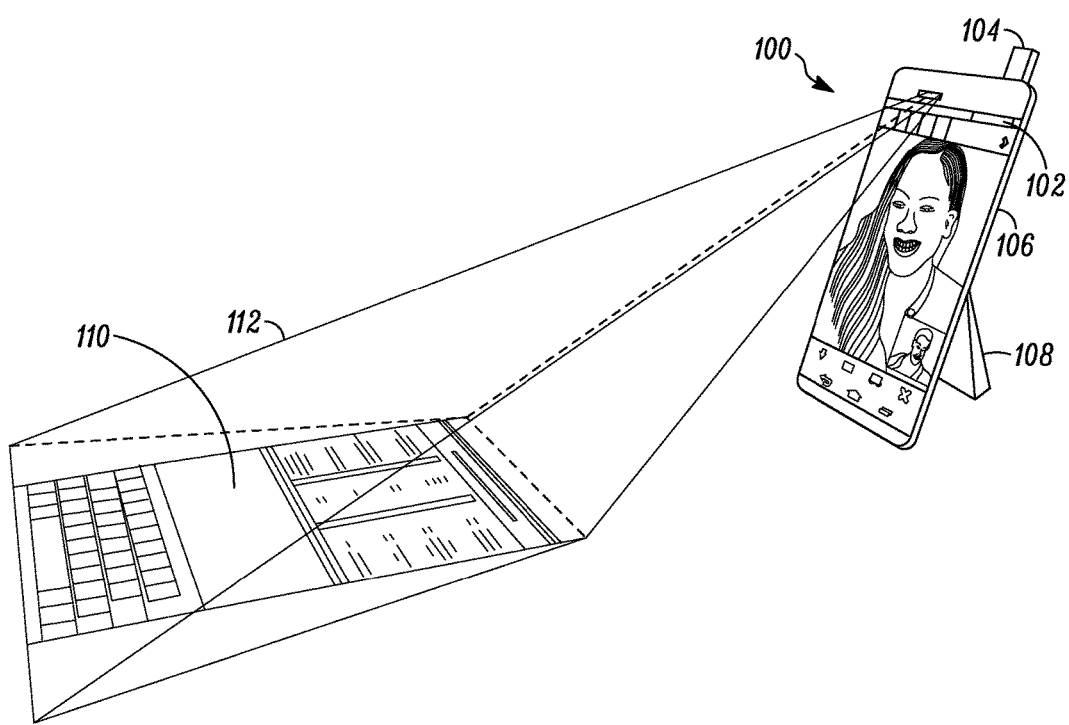
FIG. 1 shows a pictorial diagram that includes an electronic device having apparatus configured for combined vibratory and projection functions, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides apparatus, an electronic device, and a method directed to combined vibratory and projection functions. For one embodiment, an electronic device includes a projector configured to project an image and apparatus coupled to the projector. The apparatus includes a mirror configured to reflect the projected image and a motor coupled to the mirror. The mirror and motor coupling enables the mirror to function as a counterweight to the motor to configure the apparatus for a vibratory function for the electronic device. The motor is further configured to translate and rotate the mirror about a first axis to align the mirror with the projector in order to reflect the image. Combining the vibratory and projection functions within a combined apparatus enables a hardware designer of the electronic device to efficiently utilize internal space within the electronic device. For some embodiments, this efficient use of space in turn reduces design costs and reduces weight of the electronic device.

FIG. 1 shows a pictorial diagram, which illustrates an electronic device 100 having apparatus configured for combined vibratory and projection functions, in accordance with some embodiments. The electronic device 100 has a first or front lateral surface 102 on which a display is located and a second or rear lateral surface 106. Also illustrated is a plug or "blocker" 104 inserted into an opening or jack, e.g., a headset jack, on the top of the device 100, relative to the front 102 and rear 106 lateral surfaces. Further illustrated is a kickstand 108 coupled to the rear 106 of the electronic device 100. The electronic device 100 is illustrated as a mobile device, such as a smartphone. However, the electronic device 100 can also represent other devices including, but not limited to, a tablet computer, a personal digital assistant, a wearable computing device, or a laptop computer. The terms front, rear, bottom, and top are used for descriptive purposes and are contemplated as having other reference meanings with respect to the electronic device 100 in other configurations or embodiments.

The electronic device 100 includes an internal projector (not shown in FIG. 1) that projects images from the electronic device 100 onto an external surface. As shown, a projection beam 112 of light emitted by the internal projector causes an image 110 to be projected through the front lateral surface 102 of the electronic device 100 onto an external surface such as a table. For another embodiment, the electronic device 100 is configured to project an image, via an antenna beam, from the rear lateral surface 106. For yet another embodiment, the electronic device 100 is configured to project an image from the top of the electronic device 100 when the plug 104 is absent. Consequently, when the plug 104 is inserted, this blocks the projection beam thereby blocking image projection from the top of the device 100.

The kickstand 108 can be coupled to the electronic device 100 by being physically integrated into (e.g., directly connected to) the device housing or by being physically integrated into (e.g., directly connected to) a protective cover for the device housing. The kickstand 108 is configured to tilt or orient the electronic device 100 at a predetermined angle suitable for projecting the image 110. In one embodiment, the projected image 110 has a scaling factor attributed to the tilt or orientation of the electronic device 100 caused by the kickstand 108. Other components are also included in the electronic device 100, but are not explicitly shown in FIG. 1. For example, a gyroscope or accelerometer within the electronic device 100 senses the movement or orientation of the electronic device. Embodiments of the teachings herein, including the embodiments described by reference to FIGS. 2 to 11, are directed to methods and apparatus for combining vibratory and projection functions for an electronic device, taken for illustrative purposes to be the electronic device 100.

Figure 2:
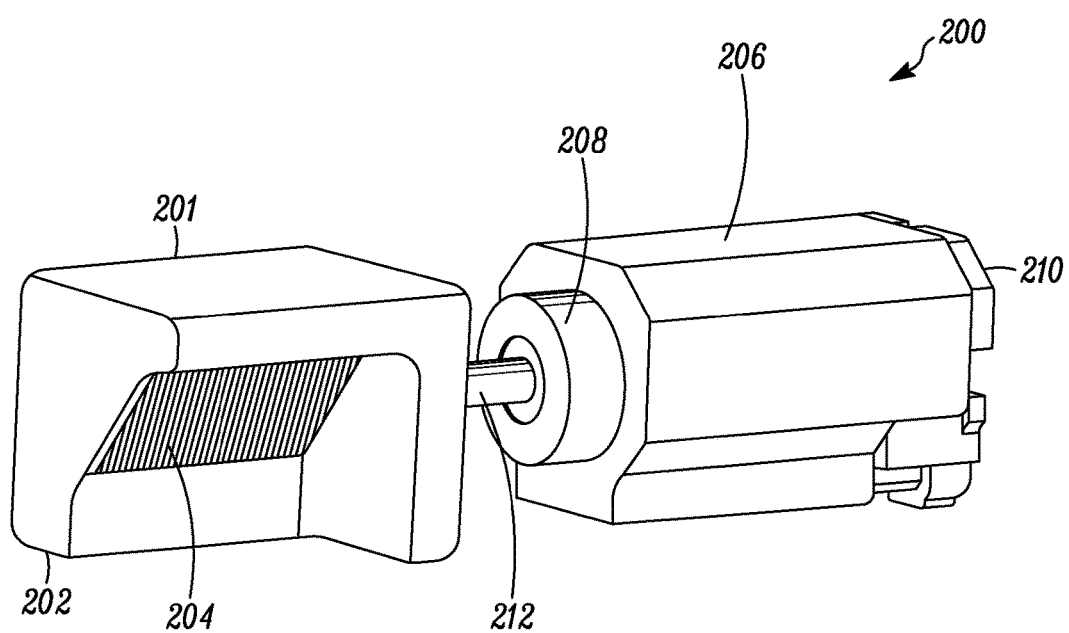
FIG. 2 shows a pictorial diagram illustrating an embodiment of apparatus configured for combined vibratory and projection functions.

FIG. 2 shows a pictorial diagram illustrating an embodiment of apparatus 200 configured to enable combined vibratory and projection functions in the electronic device 100. The apparatus 200 includes: a mirror 201 configured to reflect a projected image; a motor 206 having a first end 208 and a second end 210; and a shaft 212 that couples the mirror 201 and the motor 206. In general, the shaft 212 is oriented lengthwise along an axis (referred to herein as a first axis) to couple the mirror 201 as a first counterweight to the motor 206 to configure the apparatus 200 for a vibratory function as explained in additional detail below. Moreover, the shaft 212 is movable to enable the motor 206 to translate and rotate the mirror 201 about the first axis to align the mirror 201 to reflect the projected image in a desired direction.

The mirror 201 includes a housing 202 that contains a reflector 204. The housing 202 is made of any suitable material including a composite material such as a reinforced plastic. The reflector 204 can be made of a glass substrate with a coating that reflects light to, thereby, reflect the projected image (represented in a projection beam) in a direction as determined by the orientation, e.g., tilt, angle, of the reflector 204 and/or housing 202. For one embodiment, the reflector 204 is fixed and immovably connected within the housing 202. Accordingly, the motor 206 rotates the mirror 201 (and the reflector 204 contained therein) about the first axis by rotating the housing 202 using the shaft 212. For another embodiment, the reflector 204 is configured to rotate independently relative to the housing 202. For example, the motor 206 rotates the mirror 201 about the first axis by rotating the reflector 204 independent of the housing 202 when the rotatable shaft 212 turns.

As shown, one end of the shaft 212 is coupled to the mirror 201, while another end of the shaft 212 extends into an opening at the end 208 of the motor. The shaft 212 moves or extends at least partially within the body or structure of the motor 206 as the shaft 212 is linearly translated along the first axis between the mirror 201 and motor 206. For another embodiment, shown in FIG. 6, the shaft 212 extends from the one end 208 of the motor 206, through the body of the motor 206, and outside of the opposite end 210 of the motor 206. More particularly, apparatus 600 couples a second counterweight 602 to a rear end 604 of the shaft 212. Accordingly, the second counterweight 602 and the mirror 201 are coupled to opposite ends of the motor 206 such that the motor 206 is positioned between the mirror 201 and the second counterweight 602 along the shaft 212. The second counterweight 602 is configured, for instance as a consequence of its size and/or weight, to affect the vibratory rate of the apparatus 600 during the vibratory function. For an implementation scenario, the counterweight 602 increases the vibration strength above what can be obtained by using only the mirror 201 in order to achieve a desired vibratory strength.

For one example scenario where the device 100 operates the apparatus 200 or 600 for a projection function, the motor 206 is powered or turned on to rotate the shaft 212 in either a clockwise or counter-clockwise direction and/or linearly along the first axis to move the mirror 201 and tilt the reflector 204 under the control of a processor that may be executing software. For another example implementation scenario where the device 100 operates the apparatus 200 or 600 for a vibratory function, such as a vibratory alert, the motor 206 generates vibration when operating as a consequence of an unbalanced mass (either the mirror 201 alone as a counterweight or both the mirror 201 and component 602 as counterweights) on the driveshaft 212. The amount or strength of vibration from the motor 206 is also related to the number of revolutions per minute (RPM) that the motor 206 operates. In one embodiment, the motor 206 operates at greater than 10,000 RPM.

Figure 3:
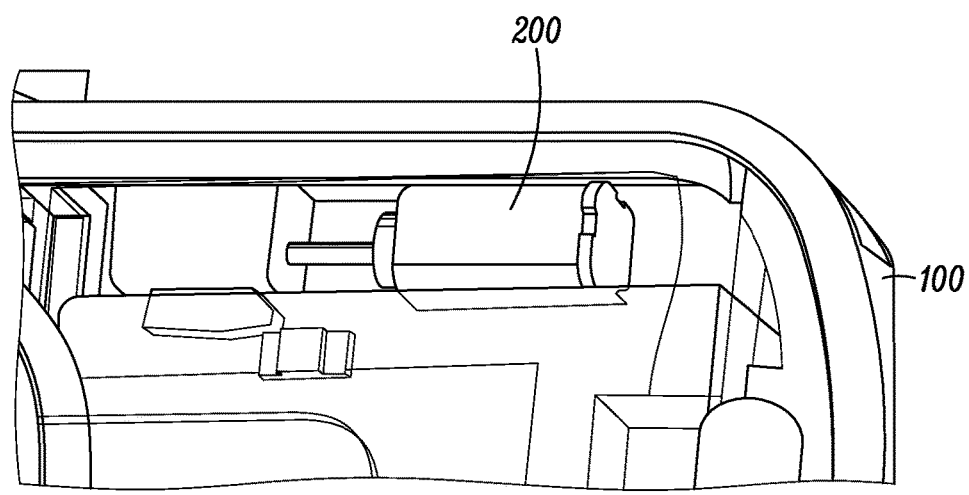
FIG. 3 shows a pictorial diagram illustrating the embodiment of apparatus shown in FIG. 2 when enclosed within an electronic device.
Figure 4:
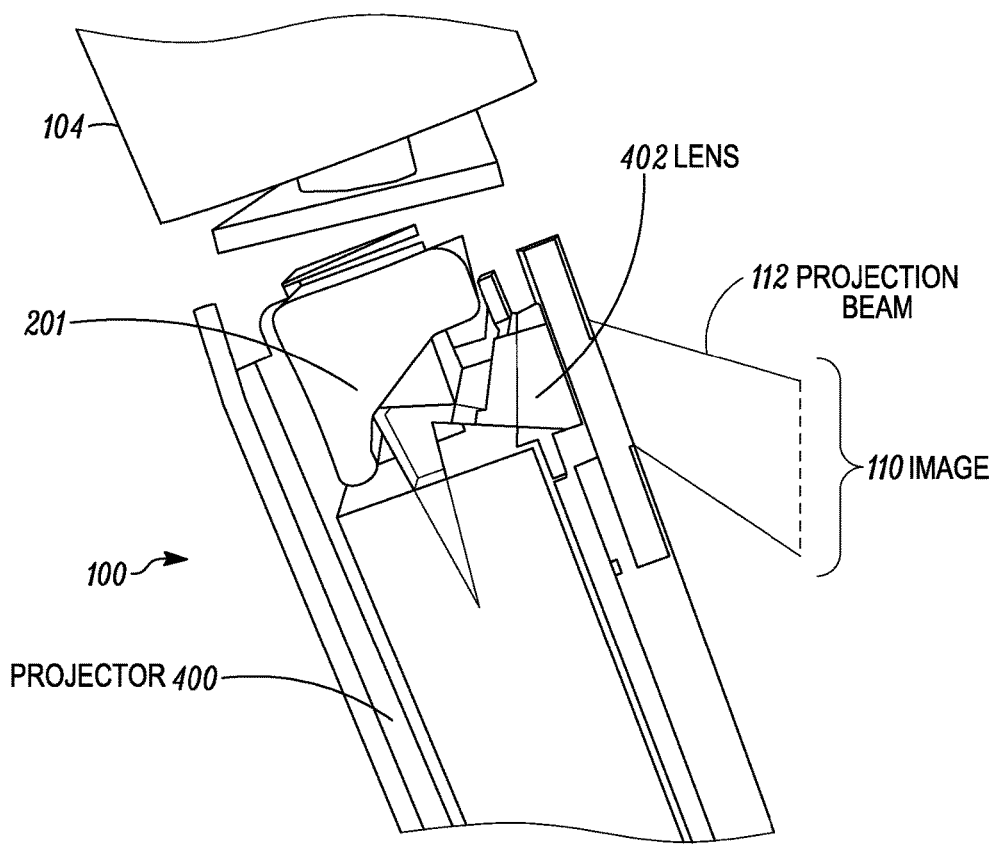
FIG. 4 shows a pictorial diagram illustrating the embodiment of apparatus shown in FIG. 2 in cooperation with other internal components.

FIGS. 3 and 4 each show a pictorial diagram illustrating the apparatus 200 shown in FIG. 2 when enclosed within the electronic device 100. FIG. 4 additionally illustrates the apparatus 200 in cooperation with other internal components. The additional internal components shown include a projector 400 and an optical lens 402, which can work cooperatively with the mirror 201 to project the image 110. For an example general implementation, the projector 400 emits the projection beam 112, which represents or contains the image 110. When the mirror 201 is not aligned with the projector 400 and the plug 104 is absent, the beam 112 may travel through the lens 402 before exiting the device 100 through an opening in the top of the electronic device 100. By contrast, when the mirror 201 is aligned with the projector 400 and the plug 104 is inserted, the beam 112 is reflected by the mirror 201 through the lens 402 before exiting the device 100 through an opening in the front or back of the electronic device 100.

The optical lens 402 is configured, for instance through its shape, to focus the reflected image from the mirror 201. Additionally, the optical lens 402 enables proper scaling of the reflected image in order to project the image 110 onto a surface with a desired or particular aspect ratio. For one embodiment, the optical lens 410 provides for a fixed aspect ratio for the projected image 110. For another embodiment, the optical lens 402 is movable and configurable to change or adjust the aspect ratio of the projected image 110, for instance proactively and/or actively, between a plurality of aspect ratios in order to produce a suitable viewable image that includes nearly all of the relevant image or information contemplated by the user for presentation to a viewing audience.

For a particular embodiment, the aspect ratio is adjusted under the control of a processor depending on context or depending on the use case for the electronic device 100. One or more contextual conditions for changing the aspect ratio can include, but is not limited to: the orientation of the electronic device 100; the environment in which the electronic device 100 is operating; and/or a user's input to the electronic device 100. Moreover, the projected image 110 can be scaled or sized as a conventional aspect ratio, such as 16×9 or 4×3 or some other predetermined aspect ratio suitable for viewing, or as an optimized, selectable, or customizable aspect ratio depending on the context. As mentioned, for some implementations, the selected aspect ratio can depend at least in part on the orientation of the electronic device 100. As such, the optical lens 402 (and consequently the associated aspect ratio) is controllable based on orientation data from one or more sensors coupled to a processor. Such sensors can include a gyroscope, a magnetometer, an accelerometer, and/or a barometer.

Figure 5:
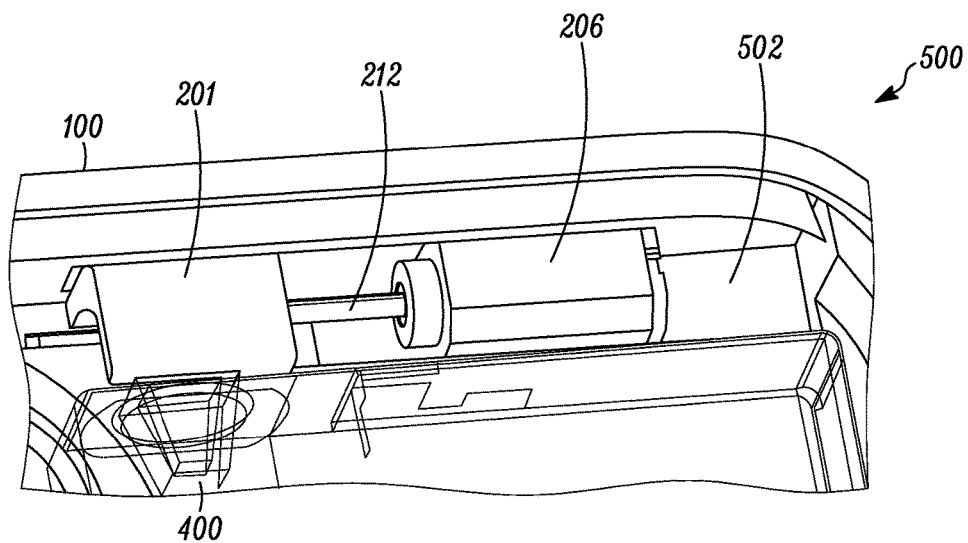
FIG. 5 shows two pictorial diagrams illustrating two views of the embodiment of apparatus shown in FIG. 2 when the apparatus translates linearly along an axis.
Figure 5:
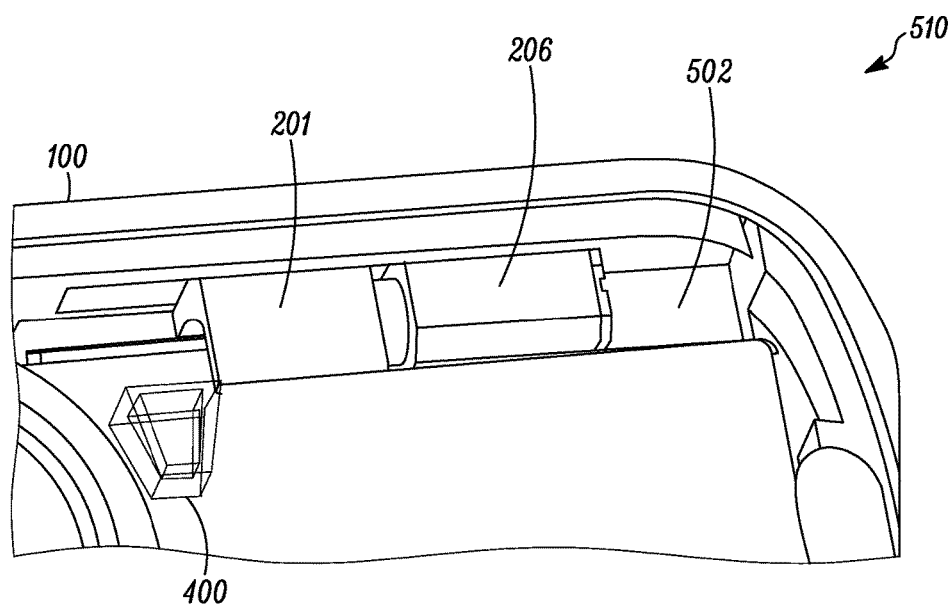
Figure 6:
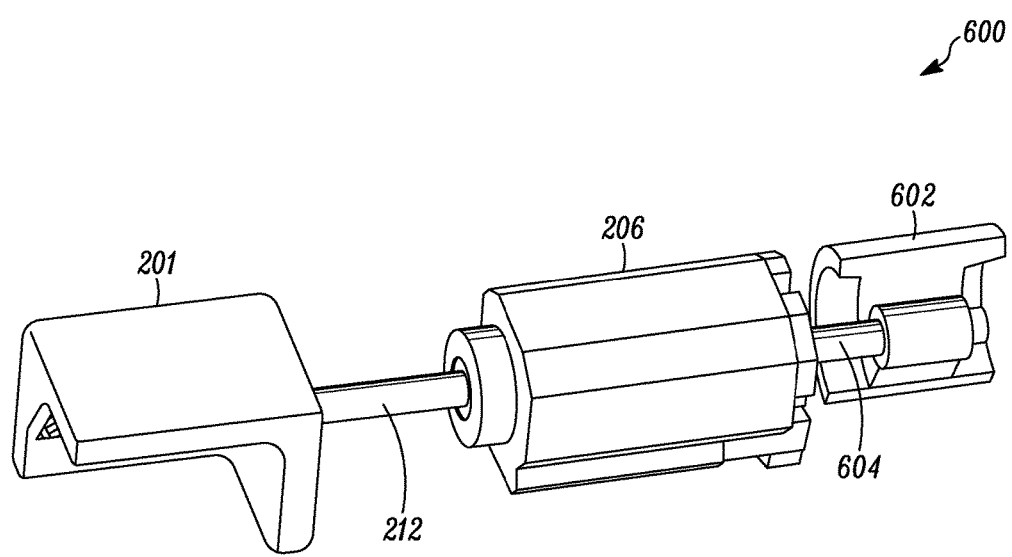
FIG. 6 shows a pictorial diagram illustrating another embodiment of apparatus configured for combined vibratory and projection functions.

FIG. 5 shows two pictorial diagrams 500 and 510 illustrating two views of the apparatus 200 shown in FIG. 2 when the apparatus 200 translates linearly along an axis parallel to a direction or plane in which the shaft 112 is aligned. In both views, the apparatus 200 is housed or contained within an enclosed space 502 of the electronic device 100. The positioning of the apparatus 200 as shown enables the electronic device 100 to operate the apparatus 200 for combined vibratory and projection functions. For example, for a general projection function, the electronic device 100 can align the mirror 201 with the projector 400 (as shown in diagram 500) to generate a reflected image of an image projected by the projector 400, wherein the aligning is performed using the motor 206 coupled to the mirror 201. For a general vibratory function, the electronic device 100 cooperatively vibrates the motor 206 and mirror 201 to generate a vibratory output alert for the electronic device 100. For a particular embodiment, the electronic device 100 translates the mirror 201 along a first axis to move the mirror 201 out of alignment with the projector 400 (as shown in diagram 510) before cooperatively vibrating the motor 206 and mirror 301.

Figure 7:
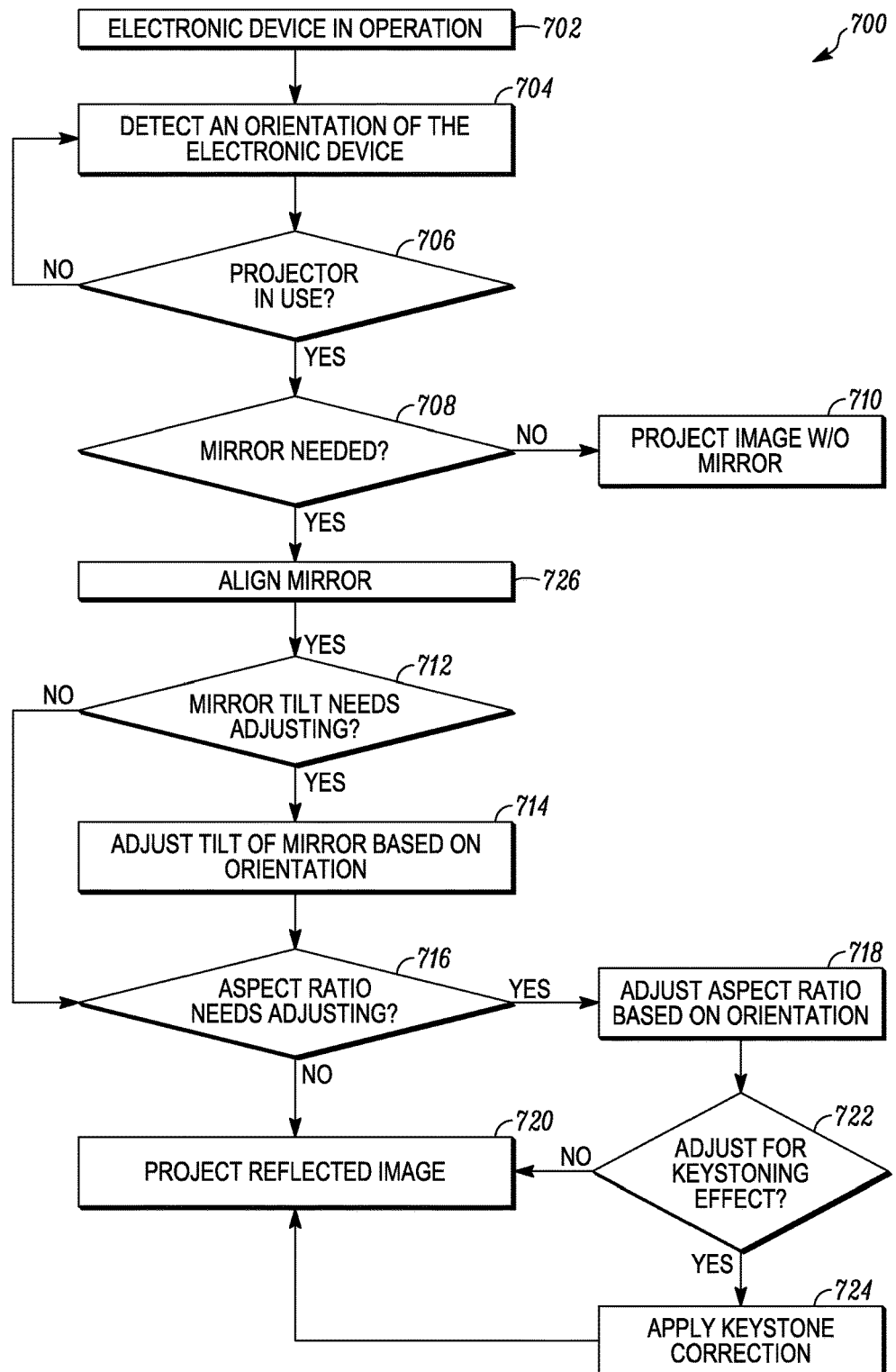
FIG. 7 shows a flow diagram illustrating an embodiment of a method for operating an electronic device having apparatus configured for combined vibratory and projection functions.
Figure 10:
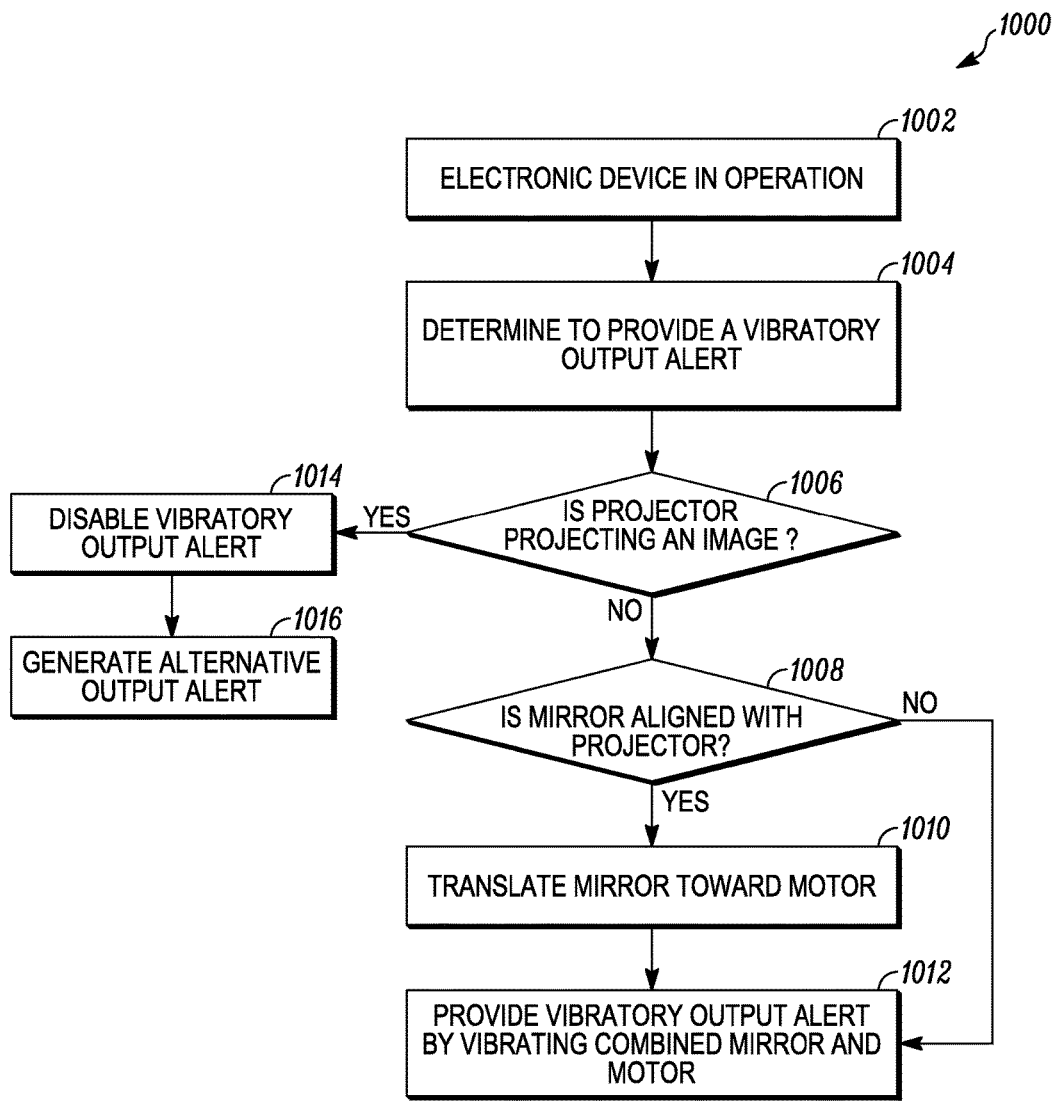
FIG. 10 shows a flow diagram illustrating an embodiment of another method for operating an electronic device having apparatus configured for combined vibratory and projection functions.

FIGS. 7 and 10 illustrate more detailed methods that can be performed by the electronic device 100, in accordance with at least one other embodiment, for operating the apparatus 200, which is configured for combined vibratory and projection functions. FIG. 7 illustrates a method 700 for operating the apparatus 200 for the projection function, and FIG. 10 illustrates a method 1000 for operating the apparatus 200 for the vibratory function. For example, the electronic device 100 through a processor operating in cooperation with the projector 400, various sensors, and the apparatus 200 performs at least part of the functionality illustrated by the methods 700 and 1000.

Figure 8:
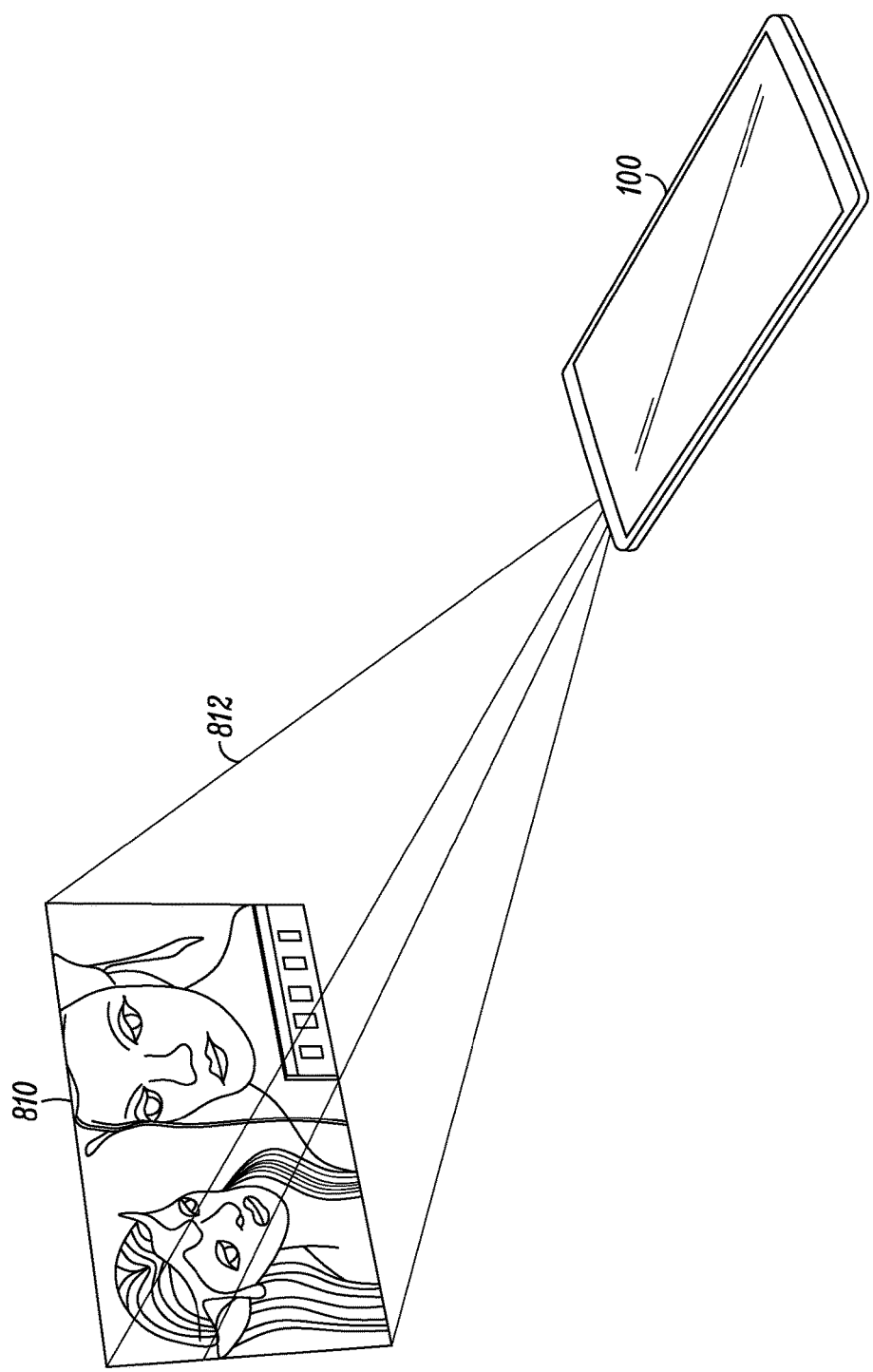
FIG. 8 shows a pictorial diagram illustrating an image projected in accordance with the method shown in FIG. 7.

More particularly, in accordance with method 700, while the electronic device 100 is on or in normal operation 702, the processor determines 704 the orientation of the electronic device 100 using orientation data provided by internal sensors. For one example scenario as shown in FIG. 8, the processor determines that the electronic device 100 is lying flat on a surface such as a conference room table. For another example scenario as shown in FIG. 9, the processor determines that the electronic device 100 is tilted or at an incline, for instance as a consequence of the electronic device 100 being held at one of multiple angles by the kickstand 108.

The processor then determines 706 whether the projector 400 is in use. When the projector 400 is not in use, the processor simply continues to monitor 704 the orientation or geospatial movement of the electronic device 100 until the projector 400 is automatically or manually activated. Upon activating 706 the projector, the processor determines 708 from the orientation data whether the mirror 201 needs to be aligned with the projector 400. If not, for example in the scenario shown in FIG. 8 where the processor detects that the electronic device 100 is laying flat, the projector 400 emits a projection beam 812 through the top of the electronic device 100 to project 710 an image 810 onto a surface (such as a wall or a projection screen) without using the mirror 201. If needed, the processor first moves the mirror 201 out of alignment with the projector 400.

Figure 9:
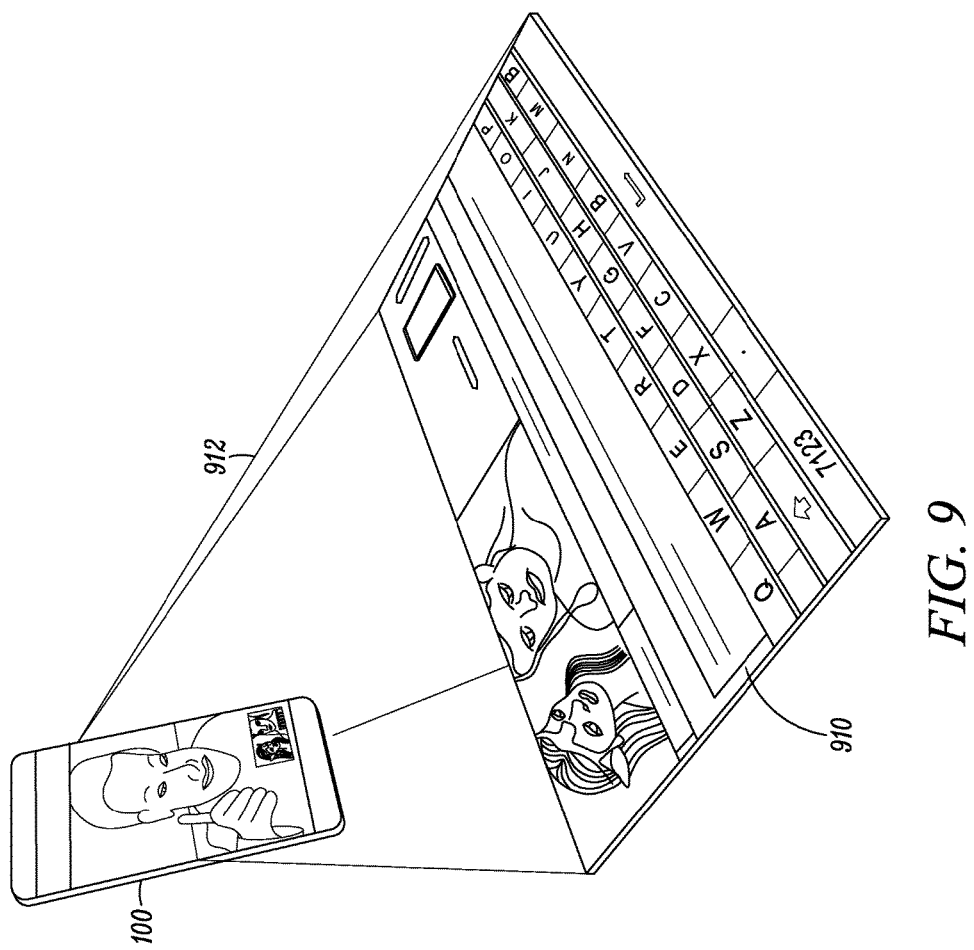
FIG. 9 shows a pictorial diagram illustrating another image projected in accordance with the method shown in FIG. 7.

If the mirror 201 is needed, for example in the scenario shown in FIG. 9 where the processor detects that the electronic device 100 is tilted at an angle, the mirror 201 is aligned 726 with the projector 400. Accordingly, the projector 400 emits a projection beam 912 that is reflected by the mirror 201 to project 720 an image 910 the through a lateral surface of the electronic device 100 onto a surface such as a conference room table. Moreover, as discussed above, the lens 402 focuses and scales the reflected image. As or before the projection beam 912 is reflected, the processor determines 712, 716 whether, respectively, the mirror tilt and/or the aspect ratio, e.g., the scaling, of the image 910 needs adjusting based on the orientation data. If so, the processor can control the making 714, 718 of these adjustments, using any suitable algorithm executed by the processor as or before the reflected image is projected 720.

For a further embodiment, the processor determines 722 whether adjustments for keystone or keystoning effect are needed due to the orientation of the electronic device 100. Keystone effect is a distortion of image dimensions, such as making a square look like a trapezoid, caused by attempting to project the image onto a surface at an angle, for example as shown in FIG. 9. Again suitable algorithms executed by the processor can be used to determine 722 whether to apply 724 keystone correction and to what extent and to apply the keystone correction as or before the reflected image is projected 720.

In accordance with method 1000, while the electronic device 100 is on or in normal operation 1002, the processor determines 1004 to provide a vibratory output alert. For example, the user has adjusted a setting on the device 100 either mechanically and/or using a setting reached through a touchscreen interface so that when alerts are required (such as to indicate incoming texts and/or emails) those alerts are provided using a vibration mechanism. However, for one implementation scenario, the electronic device 100 has been designed so that vibratory alerts are enabled only when the projector 400 is not in use, so as not to interfere with the image projection.

Accordingly, the processor determines 1006 whether the projector 400 is in use, e.g., is currently projecting an image. If the projector 400 is being used, the electronic device 100 disables 1014 the vibratory alert and generates 1016 an alternative output alert, at least during a time when an image is projected by the projector 400. For instance, when the processor provides image data to the projector 400 to project an image using the electronic device 100, the processor disables cooperatively vibrating the motor 206 and mirror 201. This can be done by keeping the motor 206 turned off during a time when the image is projected by the projector 400. Conversely, the processor controls the provision 1012 of the vibratory output alert by cooperatively vibrating the motor 206 and mirror 201 only upon detecting 1006 the absence of an image projected by the projector 400. For a further embodiment mentioned above, where it is determined 1008, e.g., through internal sensors or the processor otherwise keeping track of the position of the mirror 201, that the mirror 201 is aligned with the projector 400, the electronic device 100 translates 1010 the mirror 201 toward the motor 206 before operating the motor 206.

Figure 11:
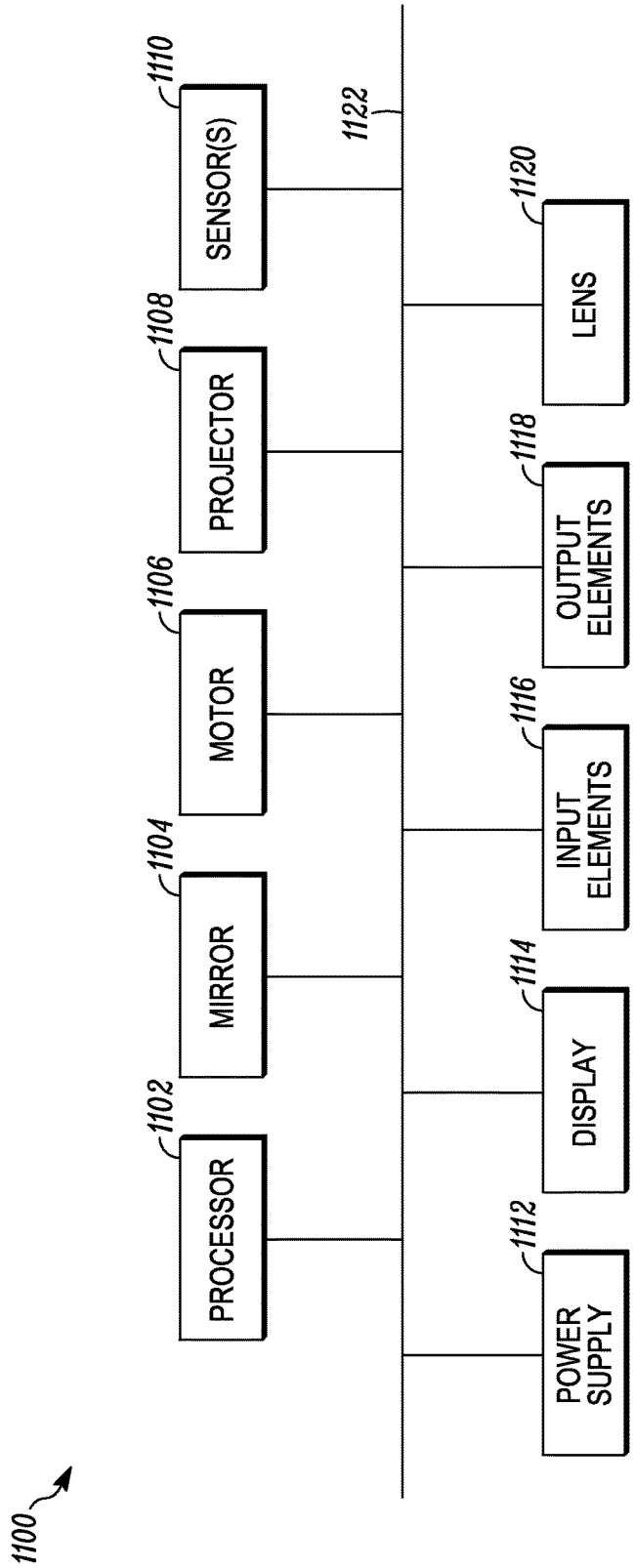
FIG. 11 shows a block diagram illustrating components of an electronic device that includes apparatus configured for combined vibratory and projection functions, in accordance with some embodiments.

FIG. 11 shows a block diagram illustrating components of an electronic device, taken in this example to be the electronic device 100, which includes apparatus configured for combined vibratory and projection functions, in accordance with some embodiments. Included within the block diagram 1100 are one or more processors 1102, a mirror 1104, a motor 1106, a projector 1108, a lens 1120, and sensors 1110 such as those mentioned earlier for use in determining device orientation. In addition, block diagram 1100 illustrates other components of the electronic device 100, including a power supply 1112, a display 1114, input elements 1116, and output elements 1118, which are all operationally and communicatively interconnected by a interconnecting component 1122, which may include by way of example a bus and/or other internal wiring or connections. A limited number of device components 1102, 1104, 1106, 1108, 1110, 1112, 1114, 1116, 1118, 1120, 1122 are shown at 1100 for ease of illustration. Other embodiments include a lesser or greater number of components in the electronic device 100. Moreover, other components needed for a commercial embodiment of an electronic device that incorporates the components 1102, 1104, 1106, 1108, 1110, 1112, 1114, 1116, 1118, 1120, 1122 shown at 1100 are omitted from FIG. 11 for clarity in describing the enclosed embodiments.

In general, the processor 1102, mirror 1104, motor 1106, projector 1108, lens 1122, and sensors 1110 are cooperatively configured for combined vibratory and projection function, for instance as illustrated and described above by reference to FIGS. 1 to 10. "Configured," "adapted," "operative," or "capable," as used herein, means that indicated components are implemented using one or more hardware elements, which may or may not be programmed with software and/or firmware, as the means for the indicated components to implement their desired functionality. Such functionality can be supported by one or more of the other device components 1112, 1114, 1116, 1118, 1122 shown in FIG. 11.

The processor 1102, for instance, include arithmetic logic and control circuitry necessary to perform the digital processing, in whole or in part, for the electronic device 100 to enable various function and operations including, but not limited to, running one or more applications, receiving and processing orientation data, and controlling apparatus 200.

For one embodiment, the processor 1102 represents a primary microprocessor, also referred to as a central processing unit (CPU), of the electronic device 100. For example, the processor 1102 can represent an application processor (AP) of the electronic device 100, such as within a tablet, a smartphone, or a laptop computer. In another embodiment, the processor 1102 is an ancillary processor, separate from the CPU, wherein the ancillary processor is dedicated to providing the processing capability, in whole or in part, needed for the components of the electronic device 100 to perform at least some of their intended functionality.

The power supply 1112 is configured to provide alternating or direct current to the electronic device 100. In this regard, the power supply 1112 represents a power source that supplies electric power to the device components 1102, 1104, 1106, 1108, 1110, 1114, 1116, 1118, 1120, 1122 as needed, during the course of their normal operation. The power is supplied to meet the individual voltage and load requirements of the device components 1102, 1104, 1106, 1108, 1110, 1114, 1116, 1118, 1120, 1122 that draw electric current. For some embodiments, the power supply 1112 is a wired power supply that provides direct current from alternating current using a full- or half-wave rectifier. For other embodiments, the power supply 1112 is a battery that powers up and runs a mobile device. For a particular embodiment, the battery 1112 is a rechargeable power source. A rechargeable power source for a device is configured to be temporarily connected to another power source external to the device to restore a charge of the rechargeable power source when it is depleted or less than fully charged. In another embodiment, the battery is simply replaced when it no longer holds sufficient electrical charge or voltage.

The display 1114 is configured as an electronic screen capable of displaying images, information, and other data viewable to a user of the electronic device 100. Several types of displays are available to the electronic device 100, including thin film transistor (TFT), capacitive touchscreens, and resistive touchscreens. Other types of displays for the electronic device 100 are organic light emitting diodes (OLEDs), active matrix-OLEDs (AMOLED), super-AMOLEDs, haptic touchscreen, and retina screens, for example. These types and technologies are hardware designer choices, dependent on the applications and functions available to the electronic device 100.

The input elements 1116 represent user-interface components of the electronic device 100 configured to allow a person to use, program, or otherwise interact with the electronic device 100. Different electronic devices for different embodiments include different combinations of input elements 1116. For example, input elements 1116 can include a keyboard, a trackpad, and a microphone. However, a touchscreen is an example element that functions both as an output element 1118 and an input element 1116 for some embodiments by allowing a user to see displayed view elements for a mobile application and to actuate view elements by tapping on them or to set a vibratory alert setting for the electronic device 100. Other output elements 1118 can further include speakers and lights operable by the electronic device 100.

The lens 1120 is configured as an optical device capable of focusing and scaling reflected and projected images emanating from the electronic device 100 in one implementation scenario. The lens 1120 include various optical glass and shapes, such as biconvex lenses, plano-convex lenses, positive and negative meniscus lenses, plano-concave lenses, and biconcave lenses. In one particular implementation scenario, two lenses slide over each other to actively vary the image parameters and focal distance corresponding to a projected image. In another implementation scenario, variable focus liquid filled lens are used to change aspect ratios of the projected image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device having apparatus configured for combined vibratory and projection functions, the electronic device comprising:
   a projector configured to project an image;
   apparatus coupled to the projector, the apparatus comprising:
      a mirror configured to reflect the image;
      a motor, wherein the mirror is coupled as a first counterweight to the motor to configure the apparatus for a vibratory function for the electronic device, wherein the motor is further configured to translate and rotate the mirror about a first axis to align the mirror with the projector to reflect the image.

2. The electronic device of claim 1 further comprising an optical lens coupled to the apparatus, wherein the optical lens is configured to focus a reflected image from the mirror.

3. The electronic device of claim 2, wherein the optical lens is further configured to control a change in aspect ratio of the reflected image between a plurality of aspect ratios.

4. The electronic device of claim 1 further comprising a processor coupled to the mirror, wherein the processor is configured to control a tilt of the mirror about the first axis.

5. The electronic device of claim 4 further comprising a set of sensors coupled to the processor and configured to sense an orientation of the electronic device and responsively provide orientation data to the processor, wherein the processor is further configured to control the tilt of the mirror based on the orientation data.

6. The electronic device of claim 5, wherein the processor is further configured to adjust an aspect ratio of a reflected image from the mirror based on the orientation data.

7. The electronic device of claim 1, wherein the apparatus further comprises a second counterweight, wherein the second counterweight and the mirror are coupled to opposite ends of the motor, wherein the second counterweight is configured to affect a vibratory rate of the apparatus during the vibratory function.

8. The electronic device of claim 1, wherein the mirror comprises a mirror housing and a reflector, wherein the motor is configured to rotate the mirror by independently rotating at least one of the mirror housing or the reflector.

9. A method for operating apparatus configured for combined vibratory and projection functions, the method comprising:
  aligning a mirror with a projector to generate a reflected image of an image projected by the projector, wherein the aligning is performed using a motor coupled to the mirror;
  cooperatively vibrating the motor and mirror to generate a vibratory output alert for an electronic device enclosing the mirror and motor.

10. The method of claim 9 further comprising translating the mirror along a first axis to move the mirror out of alignment with the projector before cooperatively vibrating the motor and mirror.

11. The method of claim 9 further comprising detecting an absence of the image projected by the projector before cooperatively vibrating the motor and mirror.

12. The method of claim 9 further comprising:
  detecting an orientation of the electronic device;
  adjusting a tilt of the mirror based on the orientation of the electronic device.

13. The method of claim 9 further comprising focusing and scaling the reflected image.

14. The method of claim 13 further comprising:
  detecting an orientation of the electronic device;
  adjusting the scaling of the reflected image based on the orientation of the electronic device.

15. The method of claim 9 further comprising disabling cooperatively vibrating the motor and mirror during a time when the image is projected by the projector.

16. The method of claim 15 further comprising generating an alternative output alert during the time when the image is projected by the projector.

17. Apparatus configured for combined vibratory and projection functions, the apparatus comprising:
  a mirror configured to reflect a projected image;
  a motor;
  a shaft oriented along a first axis to couple the mirror as a first counterweight to the motor to configure the apparatus for vibratory function, wherein the shaft is movable to enable the motor to translate and rotate the mirror about the first axis to align the mirror to reflect the projected image.

18. The apparatus of claim 17 further comprising a second counterweight coupled to the shaft and configured to affect a vibratory rate of the apparatus during the vibratory function.

19. The apparatus of claim 18, wherein the motor is positioned between the mirror and the second counterweight along the shaft.

20. The apparatus of claim 17, wherein the mirror comprises a housing and a reflector configured to rotate independently of each other to rotate the mirror about the first axis.

* * * * *